United States Patent
Truong

(10) Patent No.: US 8,045,858 B2
(45) Date of Patent: Oct. 25, 2011

(54) METHODS AND SYSTEMS FOR PROVIDING FULL AVIONICS DATA SERVICES OVER A SINGLE FIBER

(75) Inventor: Tuong Truong, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 654 days.

(21) Appl. No.: 12/179,051

(22) Filed: Jul. 24, 2008

(65) Prior Publication Data

US 2010/0021174 A1 Jan. 28, 2010

(51) Int. Cl.
*H04B 10/24* (2006.01)
*H04B 10/00* (2006.01)
*H04J 14/02* (2006.01)
*H04J 14/08* (2006.01)

(52) U.S. Cl. ............... 398/82; 398/41; 398/91; 398/98; 398/154

(58) Field of Classification Search .............. 398/41, 398/42, 82, 91, 98, 154
See application file for complete search history.

(56) References Cited

U.S. PATENT DOCUMENTS

| | | | |
|---|---|---|---|
| 5,108,167 A | 4/1992 | Kandpal et al. | |
| 5,138,675 A | 8/1992 | Schofield | |
| 5,963,349 A | 10/1999 | Norte | |
| 6,201,908 B1 | 3/2001 | Grann | |
| 6,381,045 B1 | 4/2002 | DiGiovanni et al. | |
| 6,476,951 B1 | 11/2002 | White | |
| 6,501,876 B1 | 12/2002 | Okada et al. | |
| 7,272,323 B2 | 9/2007 | Grann et al. | |
| 7,309,169 B2 | 12/2007 | Toillon et al. | |
| 7,359,592 B2 | 4/2008 | Truong | |
| 2004/0175077 A1 | 9/2004 | Weber | |
| 2006/0165417 A1 | 7/2006 | Hsieh | |
| 2006/0239609 A1* | 10/2006 | Sorin et al. | 385/24 |
| 2007/0206948 A1* | 9/2007 | Lee et al. | 398/71 |

FOREIGN PATENT DOCUMENTS

| | | |
|---|---|---|
| WO | 2007078805 A1 | 7/2007 |
| WO | 2007109277 A2 | 9/2007 |

OTHER PUBLICATIONS

International Search Report and Written Opinion of PCT/US2009/048867; Oct. 21, 2009; 15 pages.
Khayam, Omer et al.; Design and Implementation of WDM Based Multi-Hop Local Area Network; IEEE 2004; 6 pages.

* cited by examiner

*Primary Examiner* — Dalzid Singh
(74) *Attorney, Agent, or Firm* — Armstrong Teasdale LLP

(57) ABSTRACT

A method for transmission of multiple, independent data packages across a single optical fiber utilizing both time division multiplexing and wavelength division multiplexing is described. The method includes transmitting a first data package across the single optical fiber at a first wavelength and transmitting a second data package across the same optical fiber at a second wavelength, in either the same direction or in a direction opposite as the first data package, wherein the second data package transmission may be concurrent with the first data package transmission. the method further includes separating the data package transmissions into two optical paths, filtering the second wavelength from a first of the two optical paths, detecting the first data package at the first wavelength, filtering the first wavelength from a second of the two optical paths, and detecting the second data package data at the second wavelength.

20 Claims, 3 Drawing Sheets

METHODS AND SYSTEMS FOR PROVIDING FULL AVIONICS DATA SERVICES OVER A SINGLE FIBER

BACKGROUND OF THE INVENTION

The field of the invention relates generally to fiber optic networks, and more specifically, to methods and systems for providing full avionics data services over a single fiber using two wavelengths. Full data services, at least it relates to an avionic computer, generally means transmission and/or reception of mission data (control and/or sensing), health maintenance status, and configuration data loading.

The electrical data links utilized in most aircraft incorporate a first twisted pair of conductors to transmit signals, and a second twisted pair of conductors to receive sensing and/or control data. In addition, interfaces for file transfer functions such as configuration data loading and health maintenance data are also required and utilized. While about 10% of aircraft data links are high speed backbones that often require full duplex operation such as a switched network, the other 90% are lower speed access networks that typically use half duplex operation on a multicast or bus network. Typically, aircraft sensing and/or control data is periodically transmitted (or received) and these messages are generally a fixed size. File transfer data messages are not periodic. Instead, file transfer data messages are transmitted on demand and are generally of irregular file size. Data loading messages are necessary to change the configuration of airborne computing equipment to adapt to different computing applications and flight missions.

Health maintenance messages are one type of file transfer data messages that are incorporated and utilized to report health status of aircraft equipment for fast maintenance action and avoidance of long turn around time at an airport. Due to increasing functionality and capability of avionic equipment, health maintenance and configuration data have increased exponentially for each new aircraft configuration. Navigation databases and intelligent engine messaging are relevant examples of applications with large amounts of configuration and health maintenance data.

Such data can take several hours to transfer, however, turn around times at airport terminals are generally limited to about fifteen minutes. It is relatively easy to contemplate that it is costly for an aircraft to be grounded for maintenance. Typically, health maintenance data is time shared with control data on the same data link. Therefore, bandwidth would be reduced and the latency and jitter of the critical control data would be increased to accommodate the additional health maintenance data traffic.

Ideally, multiple pairs of copper wiring are used to send and receive sensing data, control data, configuration data, and health maintenance data. In a typical scenario, a file to be transferred, such as a health maintenance data file, is disassembled into dozens or hundreds of smaller pieces, so the transmission of this data can be time multiplexed with control data in the same stream. These pieces must be reassembled into the health maintenance data file at the receiving end. When time multiplexed, configuration and health maintenance data is time shared with control data on the same data link. Transmission of health maintenance data, for example, reduces the bandwidth available for the control data in order to accommodate additional health maintenance data traffic. One possible result is additional latency and jitter of the critical control data, since the computer has to perform tasks to separate the different data types and disassemble (or reassemble) data files as mentioned above.

File transfer data messages such as health maintenance messages must either be time shared with control data on a single data link or enabled utilizing a separate data link. Although the loading of new configuration data for an article of aircraft equipment can be delayed and performed at a convenient time, such as when the subject computer is not in mission operation mode, the health maintenance data needs to be transmitted concurrently to provide for the desired goal of fast maintenance actions. It is desirable to perform configuration data loading processes in real time, for example, to reconfigure one or more avionics computers "on the fly" to adapt to different phases of a single flight.

Entities involved with health maintenance data have been requesting dedicated health maintenance data links, utilizing separate wiring, for some time to help reduce airline operation cost. For this desired simultaneous and non interfering operation, additional electrical cabling and connectors must be added to each aircraft computer (which are sometimes referred to as line replaceable units (LRUs)). Unfortunately, such a solution increases LRU and aircraft costs, increases aircraft weight, and affects volume, installation and maintenance considerations.

BRIEF DESCRIPTION OF THE INVENTION

In one aspect, a method for transmission of multiple, independent data packages across a single optical fiber utilizing both time division multiplexing and wavelength division multiplexing is provided. The method includes transmitting a first data package across the single optical fiber at a first wavelength, and transmitting a second data package across the same optical fiber at a second wavelength, in either the same direction or in a direction opposite as the first data package, wherein the second data package transmission may be concurrent with the first data package transmission. The method also includes separating the data package transmissions into two optical paths, filtering the second wavelength from a first of the two optical paths, detecting the first data package at the first wavelength, filtering the first wavelength from a second of the two optical paths; and detecting the second data package data at the second wavelength.

In another aspect, an optical transceiver is provided that includes a first optical transmitter and receiver pair configured for operation at a first wavelength, a second optical transmitter and receiver pair configured for operation at a second wavelength, and an optical coupler configured to couple optical signals from the first optical transmitter and receiver pair and the second optical transmitter and receiver pair, and route the coupled optical signals from the optical coupler to a single optical fiber.

In still another aspect, an avionics unit is provided. The avionics unit includes a processing device, a computer memory associated with the processing device, an optical transceiver, and at least one communication controller configured to provide a communications interface between the processing device and the optical transceiver. The memory is configured to store at least application data, health maintenance data, and configuration data associated with the avionics unit. The optical transceiver includes a first optical transmitter and receiver pair configured for operation at a first wavelength and a second optical transmitter and receiver pair configured for operation at a second wavelength. The application data is transmitted from and received by the processing device via the first optical transmitter and receiver pair. The configuration data is received by the processing device via the second optical transmitter and receiver pair. The health maintenance data is transmitted from the processing device via the second optical transmitter and receiver pair.

In yet another aspect, a network for providing full avionics data services over a single optical fiber is provided. The network includes a first avionics unit comprising an optical interface, a second avionics unit comprising an optical interface, and a single optical fiber configured to provide at least a portion of a communications path between the first avionics unit and the second avionics unit. Each optical interface includes an optical transceiver comprising a first optical transmitter and receiver pair configured for operation at a first wavelength and a second optical transmitter and receiver pair configured for operation at a second wavelength.

In another aspect, a communications system is provided that includes a plurality of hubs and a plurality of modules. Each hub includes a plurality of optical interfaces, and each module includes at least one optical interface. Each module is optically coupled to at least two of the hubs. Each of the optical interfaces includes an optical transceiver having a first optical transmitter and receiver pair configured for operation at a first wavelength and a second optical transmitter and receiver pair configured for operation at a second wavelength.

The features, functions, and advantages that have been discussed can be achieved independently in various embodiments of the present invention or may be combined in yet other embodiments further details of which can be seen with reference to the following description and drawings.

DETAILED DESCRIPTION OF THE INVENTION

The described embodiments address the problems described above through utilization of a single optical fiber network that operates with only two wavelengths of light. The embodiments allow a full avionics data service on a single optic fiber network through the implementation of substantially simultaneous transmission of sensing and control data (bidirectional across the fiber) and file transfer data (including configuration data loading in one direction across the fiber and health maintenance data in the other direction across the fiber).

Figure 1:
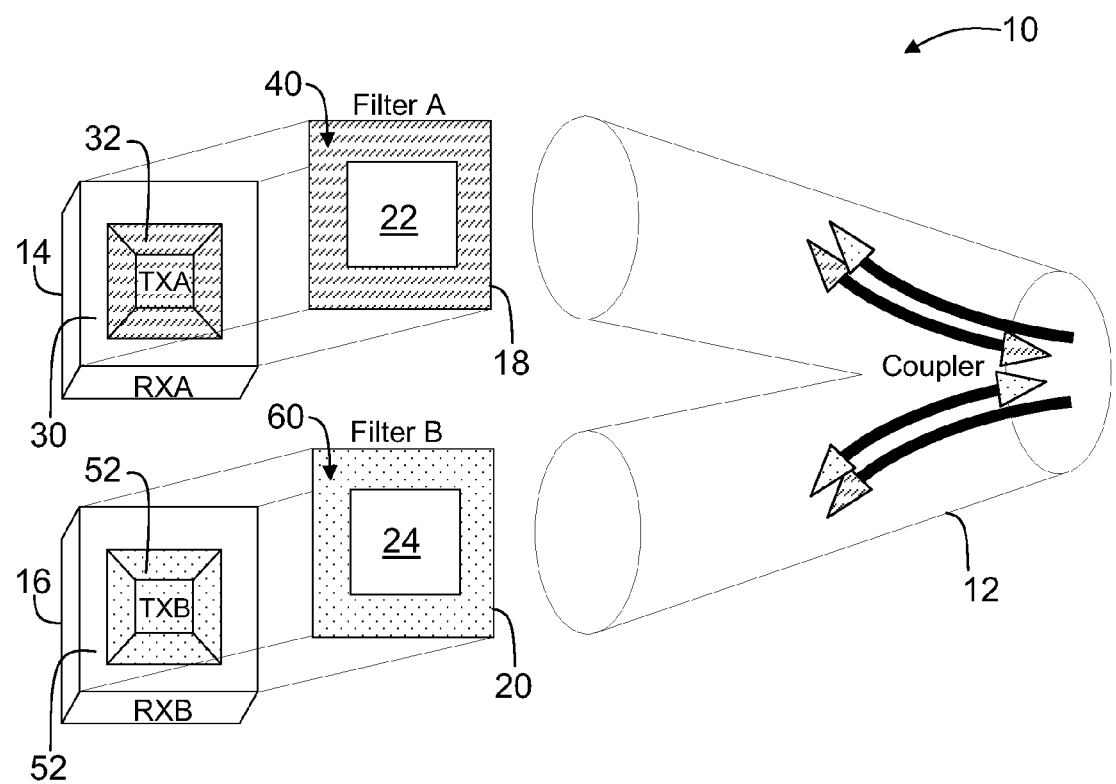
FIG. 1 is a diagram illustrating an optical interface for a dual channel, optical fiber transceiver.

FIG. 1 is a diagram illustrating an optical interface for a dual channel, optical fiber transceiver 10. Transceiver 10 includes a passive optical Y-coupler 12 for separating and combining optical signals. In one embodiment, transceiver 10 is a chip-on-chip transceiver that incorporates a LED (Light Emitting Diode or Laser Diode) and a PD (Photo Detector). Transceiver 10 is compact and low cost. When two wavelengths are utilized, as depicted in FIG. 1, transceiver A 14 transmits and receives optical signals at a first wavelength while transceiver B 16 transmits and receives optical signals at a second wavelength.

The passive optical Y-coupler 12 acts as a combiner for transceivers A 14 and B 16 in the transmit direction and acts as a splitter in the receive direction. Since the optical fiber associated with Y-coupler 12 carries both wavelengths, low cost dielectric filter films 18 and 20 have central cut outs, 22 and 24 respectively, therein to allow for the LED to transmit unimpeded through the respective cut out while filtering out the second wavelength, and preventing it from reaching the respective photo detector (and allowing the first wavelength to reach the photo detector.)

More specifically, the transceiver 14 includes a transmitter (LED) 30 and a receiver (photo detector) 32 operating at a first wavelength. The filter 18 allows the transmission from transmitter 30, at the first wavelength, through the cut out 22, and also allows the reception of signals at the first wavelength at receiver 32, through the filtering portion 40 of filter 18. The filtering portion 40 of filter 18 prevents optical signals at the second wavelength from reaching the receiver 32.

In regard to the second wavelength, the transceiver 16 includes a transmitter (LED) 50 and a receiver (photo detector (PD)) 52 operating at a second wavelength. The filter 20 allows the transmission from transmitter 50, at the second wavelength, through the cut out 24, and also allows the reception of signals at the second wavelength at receiver 52, through the filtering portion 60 of filter 20. The filtering portion 60 of filter 20 prevents optical signals at the first wavelength from reaching the receiver 52.

It should be noted that transmission and reception may be simultaneous, as long as the wavelengths are different. For example, an optical signal at a first wavelength may be received at receiver 30 while a signal at a second wavelength it emanating from transmitter 52. It should also be noted that the shape of the Y-coupler 12, filters 18 and 20, and the transceivers 14 and 16 is somewhat arbitrary. The square shape associated with filters 18 and 20, and transceivers 14 and 16, is but one example. Other embodiments, such as round, rectangular, triangular, and other shapes may be implemented. The same constraints apply to the Y-coupler 12, which may have a cross-section that is other than round.

The chip-on-chip transceiver incorporating both dual transmitters (LEDs) and dual receivers (PDs) enables compact size and low cost for a dual transceiver. For example, if first and second wavelengths are used, the first transceiver transmits and receives at the first wavelength, while the second transceiver transmits and receives at the second wavelength. The passive optical Y-coupler 12 acts as a combiner for the two transceivers in the transmit direction and acts as a splitter in the receive direction. Since the optical fiber carries both wavelengths, the low cost dielectric filter film has a cut out in the middle to allow for the LED associated with the first wavelength to transmit unimpeded therethrough while the outer perimeter of the filter film filters out the second wavelength from reaching the photo detector, and also allowing the first wavelength to pass through to reach the photo detector. Other configurations for the filter may be implemented, based on the configuration of the transmitting LED with respect to the receiving photo-detector.

Y-coupler may be fabricated used plastic or glass, based on the wavelengths of the light used. As is well known, plastic is often used in the visible light range while glass is often used in the infrared light range. The Y-coupler maybe implemented using a variety of methods including tapered optical fiber, silicon waveguide or polymer waveguide.

Figure 2:
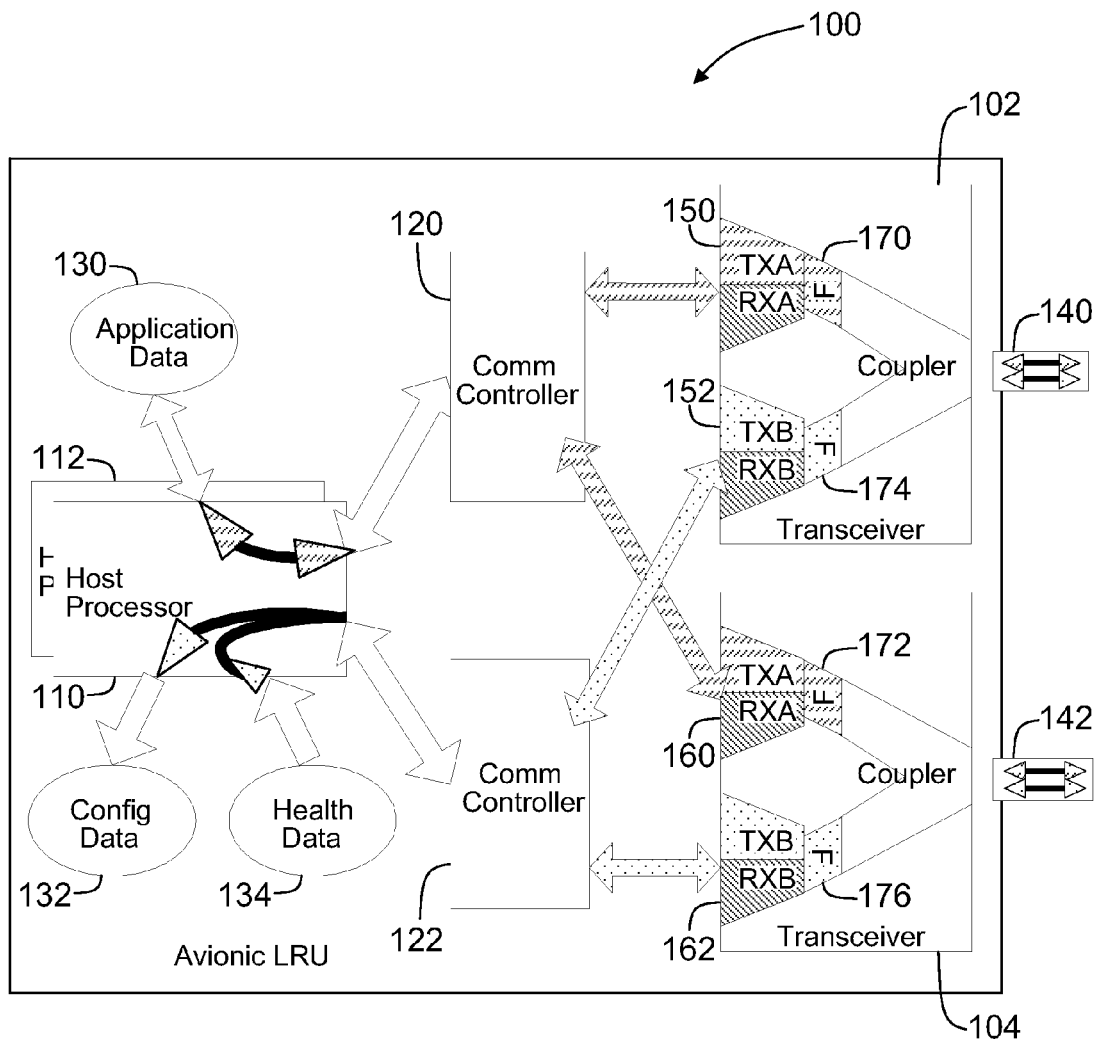
FIG. 2 is a functional diagram of an avionic computer that incorporates two of dual channel, optical fiber transceivers shown in FIG. 1.

FIG. 2 is a functional diagram of an avionic computer 100 that incorporates two of the dual channel, optical fiber transceivers described above. Transceivers 102 and 104 each provide an optical fiber communication interface. Avionic computers of the type similar to avionic computer 100 are sometimes referred to as line replaceable units (LRUs) and transceivers 102 and 104 are functionally equivalent to transceiver 10 (shown in FIG. 1).

Generally, avionics computer 100 includes one or more host processors 110 and 112. These host processors 110 and 112 communicate with a pair of communications controllers 120 and 122 which provide respective interfaces to transceivers 102 and 104. It should be noted that there are multiple possible configurations for avionics computer 100, and the configuration illustrated in FIG. 2 is but one example. Generally, all the configurations will utilize some type of processor for the handling of application data 130, configuration data 132, and health maintenance data 134, all of which are stored in computer memory and accessible by the one or more processors.

Returning to the example of FIG. 2, application data 130 is routed bi-directionally to and from the processors 110 and 112 through the communications controllers 120 and 122. For further routing of the application data 130, and to provide redundancy for fault tolerant operation, the communications controllers 120 and 122 are communicatively coupled to both transceivers 102 and 104, which are respectively coupled to individual single fiber busses 140 and 142. The application data 130 is transmitted and received on the busses 140 and 142 at a first wavelength. Configuration data 132 is received on the busses 140 and 142 at a second wavelength, filtered by the filters and routed to the memory through the transceivers 102 and 104, communications controllers 120 and 122, and processors 110 and 112. Health maintenance data 134 is retrieved from the memory by processors 110 and 112, forwarded through the communications controllers 120 and 122 to the transceivers 102 and 104 and transmitted on the busses 140 and 142 at the second wavelength.

The transceivers 102 and 104 are configured as described above with respect to transceiver 10 in that they include a first transmitter and receiver pair (150 and 160 respectively) operating at a first wavelength (based on the filters 170 and 172) and a second transmitter and receiver pair (152 and 162 respectively) operating at a second wavelength (based on the filters 174 and 176). The filters associated with each transmitter/receiver pair are utilized as described above.

Filters 170 and 172 allow the transmissions therethrough from transceivers 150 and 160, at the first wavelength (application data to be transmitted on busses 140 and 142), through a cut out (not shown in FIG. 2), and also allows the reception of signals at the first wavelength (application data received via busses 140 and 142) at transceivers 150 and 160, through the filtering portion of the respective filter 170 and 172. The filtering portion of filters 170 and 172 prevent optical signals at the second wavelength (configuration data and health maintenance data) from reaching the transceiver 152 and 162.

In addition, filters 174 and 176 allow the transmission from transceivers 152 and 162, at the second wavelength (health maintenance data to be transmitted on busses 140 and 142), through a cut out (not shown in FIG. 2), and also allows the reception of signals at the second wavelength (configuration data received via busses 140 and 142) at transceivers 152 and 162, through the filtering portion of the respective filter 174 and 176. The filtering portion of filters 174 and 176 prevent optical signals at the first wavelength (configuration data) from reaching the transceivers 150 and 160.

Each avionic computer or LRU in a system architecture typically incorporates dual redundant data links for fault tolerance and resource availability. Whether the LRU deploys a single microprocessor or dual microprocessor architecture depends on the requirement for that avionic system. As shown in the avionics computer 100 of FIG. 2, each processor 110 and 112 is communicatively coupled to two communication controllers 120 and 122. The controllers can be of the same type, or they may be different, incorporating one or more communication protocols for flexibility. Each controller 120 and 122 is communicatively coupled to two optical transceivers 102 and 104 in a crossed strap configuration to allow the optical fibers to carry dual, but distinguishable optical communication protocols. Through the utilization of bidirectional, half duplex transceivers, only two wavelengths are needed to handle all sensing/control data (application data) and all configuration and health maintenance data.

Figure 3:
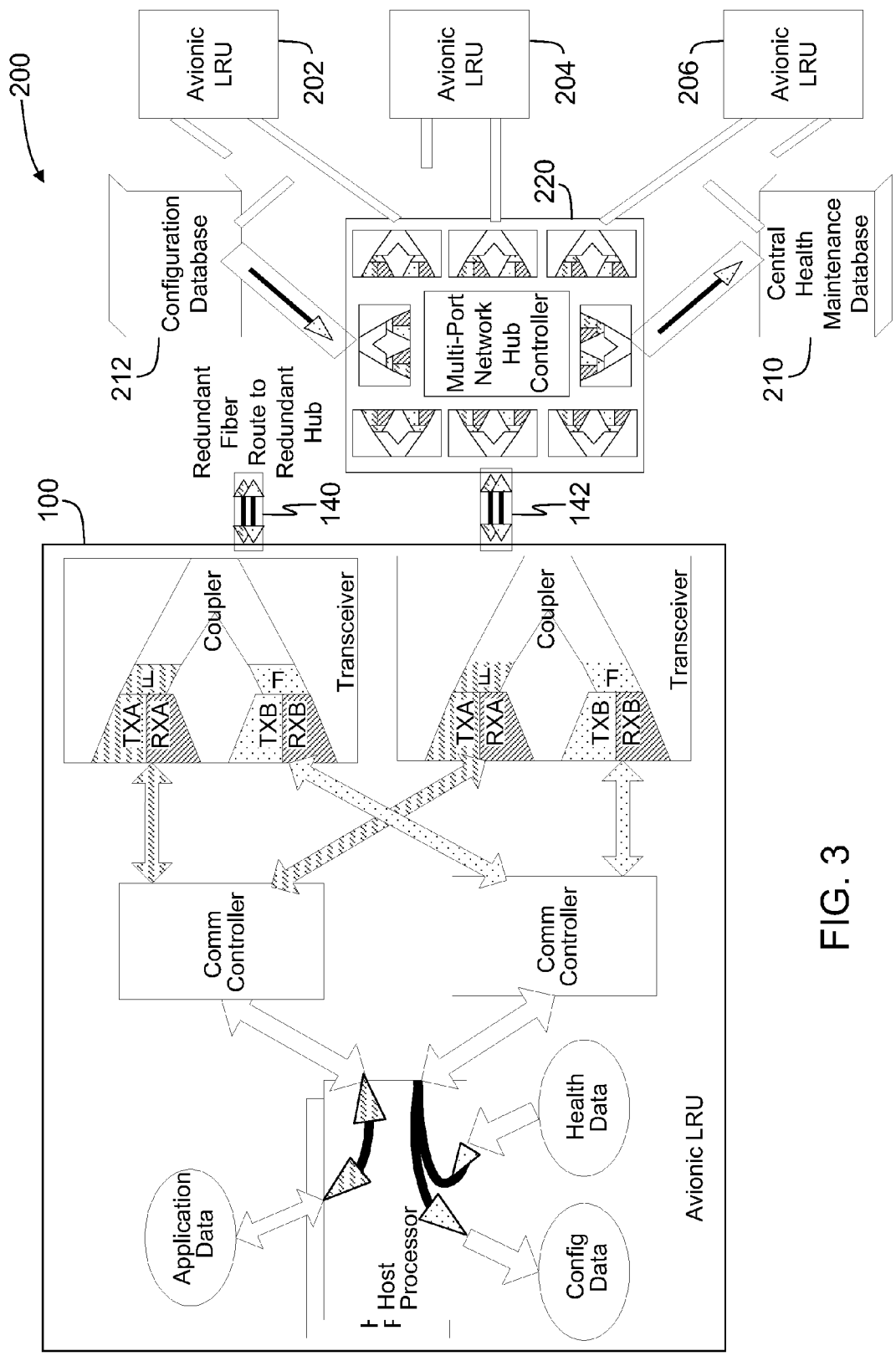
FIG. 3 is a diagram illustrating a system architecture that incorporates the avionics computer of FIG. 2.

FIG. 3 is a diagram illustrating a system architecture 200 that incorporates avionics computer 100 and multiple other avionics LRUs 202, 204, and 206, each of which provides one or more specific avionic functions. Avionics computer 100 and avionics LRUs 202, 204, and 206 are collectively referred to as avionics units. System architecture 200 further includes a central health maintenance database 210 and a configuration database 212. Avionics computer 100, avionic LRUs 202, 204, 206, central health maintenance database 210 and configuration database 212 are communicatively interconnected utilizing a multi-port network hub controller 220. Communication channels are redundant in that each of the components of system architecture 200 are connected to busses 140 and 142 (also shown in FIG. 2) and at least the avionics computers (LRUs) (100, 202, 204, and 206) incorporate the transceiver/filter configurations described herein. As all of the components of system architecture 200 incorporate the above described embodiments, full avionic data service over a single optical fiber results.

Each avionics LRU incorporates and utilizes dual redundant optical fibers for fault tolerance, and each optical fiber carries dual first and second wavelengths to provide the full avionic data transmission services that have been described herein. Dual redundant network hubs, such as multi-port network hub controller 220, are implemented within system architecture 200 for fault tolerance with each avionic computer/LRU connected to each of the multiple controllers. Each network hub controller 220 is utilized to connect the optical interfaces of multiple avionic computer/LRUs together, as well as to provide an interface to the central health maintenance database 210 and configuration database 212. These network hub controllers 220 can be cascaded to connect as many avionic computer/LRUs as allowed by the implemented communication protocols. Either active hubs (with active optoelectronics) or passive hubs (no electronics) can be utilized, depending on the quantity of LRU nodes on the data bus. Obviously a passive hub can only divide optical power to a limited number of nodes. Also, both active and passive hubs can be utilized in a mixed topology.

In a practical example, if the bandwidth needs for the configuration data/health maintenance data are small, the channel having a wavelength associated with the configuration data/health maintenance data can be utilized to supplement the sensing/control (application) data channel. Conversely, during configuration data and/or health maintenance data peak traffic both channels can be used to increase the data bandwidth. In these scenarios, the units receiving and supplying such data would have to be operable at both wavelengths so that the filtering mechanisms described herein would not impede communications.

In one embodiment, for dual channel use, both channels would have to utilize the same communication protocol. However, a file transfer channel can utilize a different communication protocol from the control data channel. Optionally, full duplex operation of sensing/control (application) data can be achieved by replacing the half duplex transceiver with a full duplex transceiver. Such a transceiver has a separate LED and photodetector within the same package (not chip on chip), and utilizes different wavelengths for transmission and reception of application data. A full duplex transceiver typically utilizes a wave division multiplexer (WDM)

mirror within the transceiver to separate the two wavelengths. A WDM mirror allows pass through of the transmit wavelength from the LED while reflects the receive wavelength to the photodetector.

The above described embodiments, when incorporated into an aircraft configuration, present a significant weight savings over the currently utilized twisted-pair wire. In addition, by avoiding additional data link twisted-pair wiring for configuration and health maintenance data, the embodiments provide significant savings in part weight, volume, cost, fabrication, assembly, handling, inventory, installation, inspection, and maintenance. Through the described method of wavelength multiplexing of different data, the embodiments invention improve bandwidth and data flow efficiency while reducing data latency and jitter. In addition, utilization of optical fiber instead of conventional wiring reduces airplane systems susceptibility to EMF and lightning strike.

By utilizing time division multiplexing of data packages as well as wavelength division multiplexing as described herein, full avionic data services of control data, sensor data, software configuration data, and health maintenance data can be transmitted across a single optical fiber without the configuration data and health data interfering with the control and sensor data thereby minimizing critical data latency and jitter.

Airlines benefit in addition to the weight savings, as the benefits of optical fiber are apparent for ease of maintenance and elimination of data network degradation due to corrosion of wire bonds as well as grounding and shielding. Also, utilization of large core plastic and multimode glass optical fibers allows visible light transmission of different colors for simple visual inspection of active communication.

The embodiments described herein result in a system capable of supporting a method for adding concurrent file transfer capabilities (such as configuration data loading to a host computer and health management traffic from a host computer) to an existing sensing and control data architecture without interfering with the transmission and reception of sensing/control data, and without adding any wiring to an aircraft. The above described architecture utilizes only two optical wavelengths, while still supporting a full avionic data service, and utilizing a single optical fiber (a second optical is provided for redundancy. The described embodiments support bidirectional, half duplex transmission and reception of control/sensing (application) data and bidirectional, half duplex configuration data loading and health management data transmissions. The embodiments support simultaneous operation of same or different communication protocols, one for sensing/control (application) data and one for configuration and health maintenance data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for transmission of multiple, independent data packages across a single optical fiber utilizing both time division multiplexing and wavelength division multiplexing, said method comprising:

transmitting a first data package across the single optical fiber at a first wavelength;

transmitting a second data package across the same optical fiber at a second wavelength, in either the same direction or in a direction opposite as the first data package, wherein the second data package transmission may be concurrent with the first data package transmission;

separating the data package transmissions into two optical paths;

filtering the second wavelength from a first of the two optical paths;

detecting the first data package at the first wavelength;

filtering the first wavelength from a second of the two optical paths; and detecting the second data package data at the second wavelength.

2. A method according to claim 1 wherein:

transmitting a first data package comprises transmitting one or more of sensor data in a first direction and control data in an opposite direction; and transmitting a first data package comprises transmitting one or more of software configuration data in a first direction and health maintenance data in an opposite direction.

3. The method of claim 1, wherein separating the data transmissions into two optical paths comprises interfacing an optical coupler to the single fiber configured to provide two optical outputs.

4. The method of claim 1 wherein:

filtering the second wavelength from a first of the two optical paths comprises filtering the second wavelength from a photo detector input associated with the first of the two optical paths; and filtering the first wavelength from a second of the two optical paths comprises filtering the first wavelength from a photo detector input associated with the second of the two optical paths.

5. An optical transceiver comprising:

a first optical transmitter and receiver pair configured for operation at a first wavelength;

a second optical transmitter and receiver pair configured for operation at a second wavelength; and an optical coupler configured to couple optical signals from said first optical transmitter and receiver pair and said second optical transmitter and receiver pair and route the coupled optical signals from said optical coupler to a single optical fiber, said optical coupler further configured to separate the data package transmissions into two optical paths, filter the second wavelength from a first of the two optical paths, and filter the first wavelength from a second of the two optical paths.

6. The optical transceiver of claim 5 wherein to filter the second wavelength from a first of the two optical paths said first optical transmitter and receiver pair comprises a filter, said filter configured to pass optical signals from a transmitter portion of said first optical transmitter and receiver pair, pass optical signals at the first wavelength to a receiver portion of said first optical transmitter and receiver pair, and prevent optical signals at the second wavelength from impinging the receiver portion of said first optical transmitter and receiver pair.

7. The optical transceiver of claim 5 wherein to filter the first wavelength from a second of the two optical paths said second optical transmitter and receiver pair comprises a filter, said filter configured to pass optical signals from a transmitter portion of said second optical transmitter and receiver pair, pass optical signals at the second wavelength to a receiver portion of said second optical transmitter and receiver pair, and prevent optical signals at the first wavelength from impinging the receiver portion of said second optical transmitter and receiver pair.

8. An avionics unit, comprising:
   a processing device;
   a computer memory associated with said processing device, said memory configured to store at least application data associated with said unit, health maintenance data associated with said unit, and configuration data associated with said unit;
   an optical transceiver comprising a first optical transmitter and receiver pair configured for operation at a first wavelength and a second optical transmitter and receiver pair configured for operation at a second wavelength; and
   at least one communication controller configured to simultaneously provide a communications interface between said processing device and said optical transceiver, application data transmitted from and received by said processing device via said first optical transmitter and receiver pair, configuration data received by said processing device via said second optical transmitter and receiver pair, and health maintenance data transmitted from said processing device via said second optical transmitter and receiver pair.

9. The avionics unit of claim 8 comprising a plurality of said optical transceivers communicatively coupled to said processing device via said at least one communications controller.

10. The avionics unit of claim 8 wherein:
    said first optical transmitter and receiver pair comprises a first filter, said first filter configured to pass optical signals from a transmitter portion of said first optical transmitter and receiver pair, pass optical signals at the first wavelength to a receiver portion of said first optical transmitter and receiver pair, and prevent optical signals at the second wavelength from impinging the receiver portion of said first optical transmitter and receiver pair; and
    said second optical transmitter and receiver pair comprises a second filter, said second filter configured to pass optical signals from a transmitter portion of said second optical transmitter and receiver pair, pass optical signals at the second wavelength to a receiver portion of said second optical transmitter and receiver pair, and prevent optical signals at the first wavelength from impinging the receiver portion of said second optical transmitter and receiver pair.

11. The avionics unit of claim 8 wherein said optical transceiver comprises an optical coupler configured to:
    combine optical signals received from said first optical transmitter and receiver pair and said second optical transmitter and receiver pair for output onto a single optical fiber; and
    separate the signals received from the optical fiber into two separate optical paths.

12. An aircraft network for providing full avionics data services over a single optical fiber, said network comprising:
    a first avionics unit comprising an optical interface;
    a second avionics unit comprising an optical interface;
    a single optical fiber configured to provide at least a portion of a communications path between said first avionics unit and said second avionics unit, each said optical interface comprising an optical transceiver comprising a first optical transmitter and receiver pair configured for operation at a first wavelength and a second optical transmitter and receiver pair configured for operation at a second wavelength; and
    a multi-port network hub controller and a plurality of said single optical fibers, said first avionics unit optically connected to said multi-port network hub controller using one of said single optical fibers, and said second avionics unit optically connected to said multi-port network hub controller using one of said single optical fibers.

13. The aircraft network of claim 12 wherein:
    said first optical transmitter and receiver pair comprises a first filter, said first filter configured to pass optical signals from a transmitter portion of said first optical transmitter and receiver pair, pass optical signals at the first wavelength to a receiver portion of said first optical transmitter and receiver pair, and prevent optical signals at the second wavelength from impinging the receiver portion of said first optical transmitter and receiver pair; and
    said second optical transmitter and receiver pair comprises a second filter, said second filter configured to pass optical signals from a transmitter portion of said second optical transmitter and receiver pair, pass optical signals at the second wavelength to a receiver portion of said second optical transmitter and receiver pair, and prevent optical signals at the first wavelength from impinging the receiver portion of said second optical transmitter and receiver pair.

14. The aircraft network of claim 12 wherein each said optical transceiver comprises an optical coupler configured to:
    combine optical signals received from said first optical transmitter and receiver pair and said second optical transmitter and receiver pair for output onto said single optical fiber; and
    separate the signals received from said single optical fiber into two separate optical paths.

15. The aircraft network of claim 12 wherein said first avionics unit and said second avionics unit each comprise a plurality of said optical interfaces to provide redundant communications paths, each communications path provided over a single optical fiber.

16. The aircraft network of claim 12 wherein said first avionics unit and said second avionics unit are configured to transmit and receive application data associated with the respective said avionics unit over said single optical fiber at the first wavelength.

17. The aircraft network of claim 16 further comprising a configuration data unit configured to provide configuration data to at least one of said first avionic unit and said second avionic unit, said configuration data unit configured to provide the configuration data over said single optical fiber at the second wavelength.

18. The aircraft network of claim 16 further comprising a health maintenance data unit configured to receive health maintenance data from at least one of said first avionic unit and said second avionic unit, said health maintenance unit configured to receive the health maintenance data over said single optical fiber at the second wavelength.

19. A communications system, comprising:
    a plurality of hubs, each said hub comprising a plurality of optical interfaces; and
    a plurality of modules each comprising at least one optical interface, each said module optically coupled to at least two of said hubs, each said optical interface comprising:
    an optical transceiver comprising:

a first optical transmitter and receiver pair configured for operation at a first wavelength;

a second optical transmitter and receiver pair configured for operation at a second wavelength; and an optical coupler configured to couple optical signals from said first optical transmitter and receiver pair and said second optical transmitter and receiver pair and route the coupled optical signals from said optical coupler to a single optical fiber, said optical coupler further configured to separate the data package transmissions into two optical paths, filter the second wavelength from a first of the two optical paths, and filter the first wavelength from a second of the two optical paths.

20. The communications system of claim 19 wherein each of said modules is configured to communicate with each of the other said modules via one or more of said hubs.

* * * * *